United States Patent
Baker (10) Patent No.: US 10,922,587 B2
(45) Date of Patent: Feb. 16, 2021

(54) ANALYZING AND CORRECTING VULNERABILITIES IN NEURAL NETWORKS

(71) Applicant: D5AI LLC, Maitland, FL (US)

(72) Inventor: James K. Baker, Maitland, FL (US)

(73) Assignee: D5AI LLC, Maitland, FL (US)

(*) Notice: Subject to any disclaimer, the term of this patent is extended or adjusted under 35 U.S.C. 154(b) by 0 days.

(21) Appl. No.: 16/619,338

(22) PCT Filed: Jun. 27, 2019

(86) PCT No.: PCT/US2019/039383
§ 371 (c)(1),
(2) Date: Dec. 4, 2019

(87) PCT Pub. No.: WO2020/009881
PCT Pub. Date: Jan. 9, 2020

(65) Prior Publication Data
US 2020/0410295 A1 Dec. 31, 2020

Related U.S. Application Data (60) Provisional application No. 62/693,520, filed on Jul. 3, 2018.

(51) Int. Cl.
*G06N 20/00* (2019.01)
*G06N 3/08* (2006.01)
(Continued)

(52) U.S. Cl.
CPC ......... *G06K 9/6262* (2013.01); *G06K 9/6227* (2013.01); *G06N 3/0481* (2013.01);
(Continued)

(58) Field of Classification Search
CPC .... G06K 9/6262; G06K 9/6227; G06N 20/00; G06N 3/0481; G06N 3/082; G06N 3/084
See application file for complete search history.

(56) References Cited

U.S. PATENT DOCUMENTS

2015/0195146 A1 7/2015 Di Pietro et al.
2016/0350648 A1* 12/2016 Gilad-Bachrach ............ G06N 3/0481
(Continued)

FOREIGN PATENT DOCUMENTS

WO WO 2018/063840 A1 4/2018
WO WO 2018/175098 A1 9/2018
(Continued)

OTHER PUBLICATIONS

Papernot, Nicolas, et al. "The limitations of deep learning in adversarial settings." 2016 IEEE European symposium on security and privacy (EuroS&P). IEEE, 2016. (Year: 2016).*
(Continued)

*Primary Examiner* — Li B. Zhen
*Assistant Examiner* — Markus A. Vasquez
(74) *Attorney, Agent, or Firm* — K&L Gates LLP (57) ABSTRACT

Systems and methods analyze and correct the vulnerability of individual nodes in a neural network to changes in the input data. The analysis comprises first changing the activation function of one or more nodes to make them more vulnerable. The vulnerability is then measured based on a norm on the vector of partial derivatives of the network objective evaluated on each training data item. The system is made less vulnerable by splitting the data based on the sign of the partial derivative of the network objective with respect to a vulnerable and training new ensemble members on selected subsets from the data split.

48 Claims, 3 Drawing Sheets

(51) Int. Cl.
*G06N 3/04* (2006.01)
*G06K 9/62* (2006.01)

(52) U.S. Cl.
CPC ............. *G06N 3/082* (2013.01); *G06N 3/084* (2013.01); *G06N 20/00* (2019.01)

(56) References Cited

U.S. PATENT DOCUMENTS

2019/0095798 A1    3/2019   Baker
2019/0303720 A1*  10/2019   Karam .................. G06K 9/624

FOREIGN PATENT DOCUMENTS

| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

International Search Report and Written Opinion of the International Searching Authority for International Application No. PCT/US2019/039383 dated Oct. 2, 2019.

Catal et al., "Can We Predict Software Vulnerability with Deep Neural Network?", ResearchGate, Oct. 2016, <https://www.researchgate.net/profile/Akhan_Akbulut/publication/322131540_Can_We_Predict_Software_Vulnerability_with_Deep_Neural_Network/links/5a467bb30f7e9ba868aa4b4a/Can_We_ Predict_Software_Vulnerability_with_Deep_Neural_Network.pdf> , 5 pages.

Brownlee, Jason, "Gentle introduction to Vector Norms in Machine Learning", Linear Algebra, Feb. 5, 2018, <https://machinelearningmastery.com/vector-norms-machine-learning/> , 8 pages.

Mate Labs, "Everything You Need to Know About Neural Networks", Hacker Noon, Nov. 1, 2017, <https://hackernoon.com/everything_you_need_to_know_about_neural_networks-8988c3ee4491>, 19 pages.

* cited by examiner

ANALYZING AND CORRECTING VULNERABILITIES IN NEURAL NETWORKS

PRIORITY CLAIM

The present application is a national stage application under 35 U.S.C. § 371 of PCT application Serial No. PCT/US19/39383, filed Jun. 27, 2019, which claims priority to U.S. Provisional Patent Application Ser. No. 62/693,520, filed Jul. 3, 2018, both having the same title and inventor as indicated above, and both of which are incorporated herein by reference.

BACKGROUND

In recent years, great progress has been made in machine learning and artificial intelligence, especially in the field of multi-layer neural networks called deep learning. Deep, multi-layer neural networks have a large number of learned parameters that can be trained to model extremely complex decision surfaces. However, this capability to model a complex decision surface also leads to a vulnerability. Such a complex decision surface is not as smooth as the decision surface for a less complex machine learning system. The lack of smoothness in the decision surface can cause the model to be sensitive to small changes in the input data. For example, in image recognition, changes to an image that are imperceptible to human viewers can cause a deep neural network image recognition system to change its output from the correct classification to an arbitrarily different incorrect classification.

SUMMARY

The invention disclosed herein, in one general aspect, provides a system and method for analyzing and correcting the vulnerability of individual nodes in a neural network to changes in the input data. The analysis comprises first changing the activation function of one or more nodes to make them more vulnerable. The vulnerability is then measured based on a norm on the vector of partial derivatives of the network objective evaluated on each training data item. The system is made less vulnerable by splitting the training data based on the sign of the partial derivative of the network objective with respect to a vulnerable node and then training new ensemble members on selected subsets from the data split.

FIGURES

Various embodiments of the present invention are described herein by way of example in connection with the following figures, wherein.

DETAILED DESCRIPTION

The following description has set forth aspects of computer-implemented devices and/or processes via the use of block diagrams, flowcharts, and/or examples, which may contain one or more functions and/or operations. As used herein, the terms "step" or "block" in the block diagrams and flowcharts refers to a step of a computer-implemented process executed by a computer system, which may be implemented as a machine learning system or an assembly of machine learning systems. Accordingly, each step or block can be embodied as a set of computer executable instructions stored in the memory of a computer system that, when executed by a processor of the computer system, cause the computer system to perform the described function(s). Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 1:
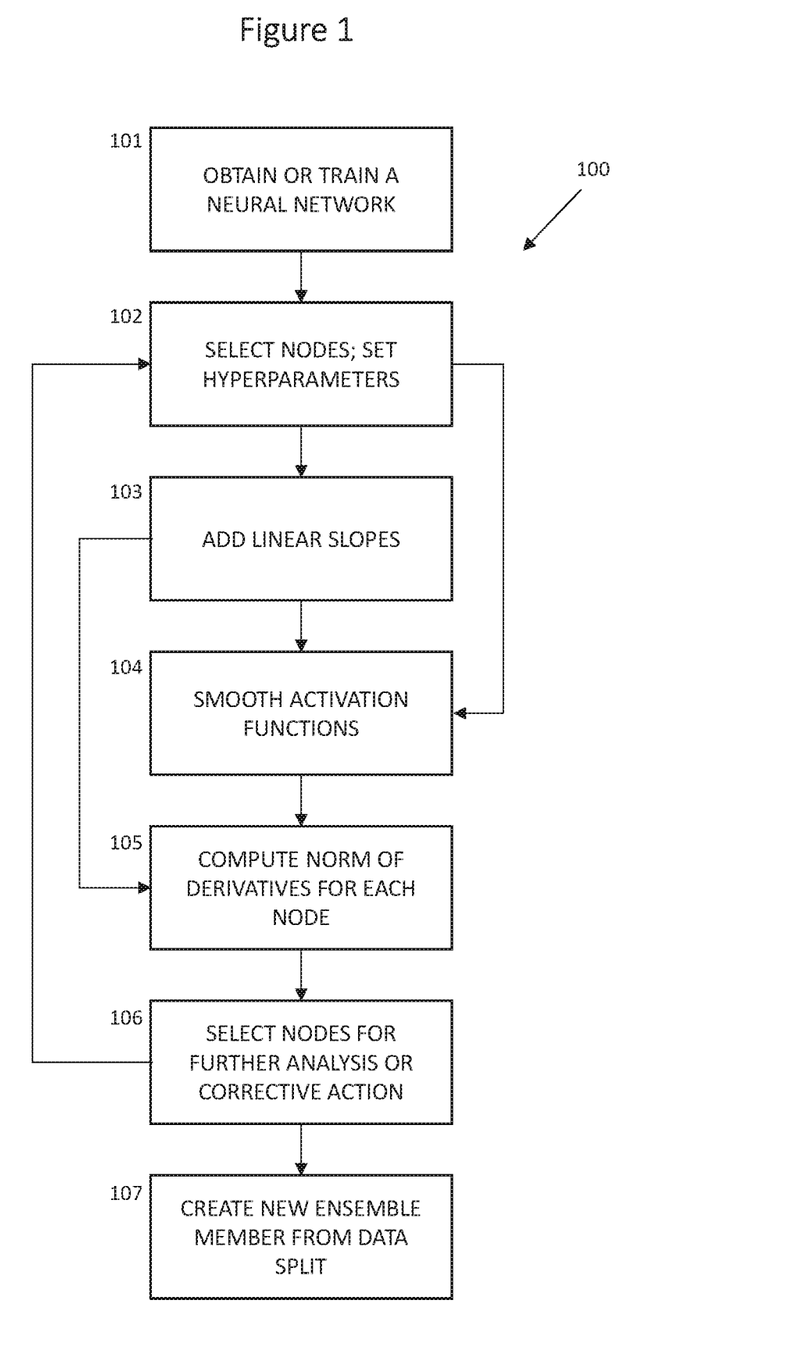
FIG. 1 is a flow chart of a process according to various embodiments of the present invention.

FIG. 1 is a flowchart of an illustrative embodiment of a process 100 for analyzing and correcting the vulnerability of individual nodes in a neural network to changes in the input data. The process of FIG. 1 may be implemented with a computer system, such as the computer system 300 described in more detail below in connection with FIG. 3. In this discussion, a neural network comprises a network of nodes organized into layers, comprising a layer of input nodes, zero or more inner (or "hidden") layers of nodes, and a layer of output nodes. An example of a neural network in shown in FIG. 2. A neural network includes an input node associated with each input variable and an output node associated with each output variable. A given node in the output layer or in an inner layer is connected to one or more nodes in lower layers by means of a directed arc (shown as arrows in FIG. 2) from the node in the lower layer to the given higher layer node. A directed arc may be associated with a trainable parameter, called its weight, which represents the strength of the connection from the lower node to the given higher node. A trainable parameter is also called a "learned" parameter. Other parameters that control the learning process are called "hyperparameters."

Figure 2:
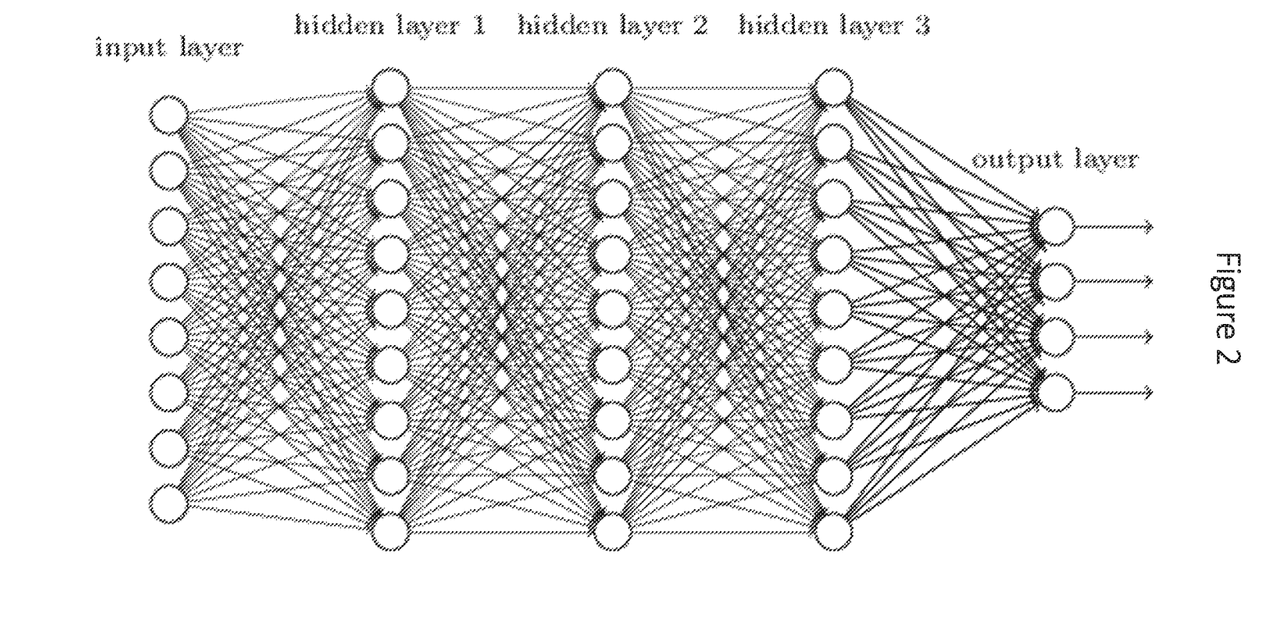
FIG. 2 is a diagram of a sample neural network.

Each node in the output layer or in an inner layer is also associated with a function, called its activation function. The activation function of a node computes a value based on the values received from lower level connected nodes and the associated connection weights. For example, the activation value of a node for a data item might be determined by the formula:

$$A(x_1, x_2, \ldots, x_k, w_1, w_2, \ldots, w_k) = f\left(\sum_{i=1}^{k} w_i x_i + b\right),$$

where the values $x_i$ are the activation values of the connected lower level nodes, and the values $w_i$ are the respective connection weights, and b is a learned parameter associated with the node, called its bias, which is a constant independent of the current data item. In this example, the function $A=f(x)$ is called the activation function.

An example of the function $A=f(x)$ is the sigmoid function, defined by $A=f(x)=1/(1+\exp(-x))$. Another example is the function defined by $A=f(x)=\max(0, x)$. A node with this activation function is referred to as a rectified linear unit (ReLU). A third example is a piecewise linear function defined by A=f(x)=min(1, max(0, x)). This activation function is sometimes called a "hard sigmoid." A fourth example is the step function defined by A=f(x)=0 if x≤0, 1 if x>0. This step function is also called the Perceptron function, after the name of the original simplified artificial model of a neuron.

In a second example of the possible form on a node activation, the activation of a node may directly depend on the individual activation values of the connected lower level nodes, for example: $f(x_1, x_2, \ldots, x_k) = \max_i\{x_i\}$. In this case, the multi-input max( ) function is referred to as the activation function.

At step 101, the computer system (e.g., the computer system 300 of FIG. 3) executing the process 100 trains a neural network (e.g., the neural network of FIG. 2) or obtains a neural network that has already been trained. For example, at step 101, the computer system may train a neural network using the method of stochastic gradient descent based on iterative updates in the connection weights and other trained parameters, with an estimated gradient and update computed for each minibatch of training data items using feed forward activations and a back propagation computation for each item of training data. This training method is well known to those skilled in the art of training neural networks.

At step 102, the computer system selects a first set of one or more nodes of the network to be analyzed for potential vulnerability in steps 105 and 106 of the process 100, described further below. In one embodiment, each of the input nodes is among the first set of selected nodes. In one embodiment, the first set of selected nodes (at least on an initial pass through the process 100) consists exclusively of the input nodes of the network. In other words, the process 100 analyzes the vulnerability of the input nodes of the network in this particular embodiment. However, any other node in the network may also be selected. At step 102, the computer system also sets the values of certain hyperparameters of the network, which hyperparameters affect the learning by the network, as further discussed below. At step 102, the computer system may also select a second set of one or more nodes to which the operations of step 103 and/or step 104 of the process (described further below) may be applied. This second set of nodes may include nodes in any layer (i.e., input, inner and/or output layer nodes), including nodes in different layers. However, in some embodiments, including an input layer node in the second set of selected nodes typically has no beneficial effect. The nodes in the first and second sets may be completely disjoint, partially overlapping, or completely overlapping (i.e., identical sets of nodes).

The nodes in the first set of selected nodes are selected to have their individual vulnerabilities analyzed. The nodes in the second set of selected nodes are selected to have their activation functions modified at steps 103 and/or 104 (described below) to make the network more vulnerable to disturbances in the input data and thereby to make the vulnerabilities of the first set of nodes more easily observed.

At steps 103 and 104 the computer system changes the activation function of the nodes in the second set, as described below. Steps 103 and 104 may be performed in either order. Each step is optional if the other step is present. In some embodiments in which multiple passes are to be performed of the loop from step 102 through step 106 and back to step 102, both steps 103 and 104 may be omitted in one pass, such as an initial pass from step 102 through step 106 to make a preliminary assessment of the vulnerability of the first set of selected nodes.

At step 103, the computer system adds a linear slope to the activation function of one or more of the second set of selected nodes. Let A=f(x) be the activation of a node using the first form of activation function discussed above. Then, at step 103 the computer system may replace the activation function of the node with the activation function A=f(x)+s*x, where the slope s is a hyperparameter. In one embodiment, the value of s is a positive number less than 1.0. The value of the hyperparameter s may be set experimentally by a process called hyperparameter tuning, which is well-known to those skilled in the art of machine learning. Further, the value of the hyperparameter s may be adjusted to fit conditions in different phases of the learning process. For example, the value of the hyperparameter s may be adjusted by a learning coach.

In various embodiments, a learning coach is used to learn or otherwise determine the value of the hypermeter s. A leaning coach is a second machine learning system that learns to guide the learning process of a first machine learning system (e.g., the neural network of FIG. 2). Learning coaches are described in more detail in the following applications, which are each incorporated herein by reference in their entirety: PCT Application Publication No. WO2018/063840, entitled "LEARNING COACH FOR MACHINE LEARNING SYSTEM"; and PCT Application Publication No. WO2018/175098, entitled "LEARNING COACH FOR MACHINE LEARNING SYSTEM."

Step 103 guarantees for any monotonic activation function that the derivative of the modified function will always be at least s. In some embodiments, step 103 does not add a linear slope to an activation function for which the minimum value of the derivative of the activation function is already greater than s.

At step 104, the computer system smooths the activation function of one or more selected inner layer or output nodes in the second set. In one embodiment, at step 104 the computer system performs a type of smoothing such that the derivative of the smoothed function for a given input value depends on values of the function for some interval around the given input value, not just on limiting values in an incremental neighborhood as does the derivative of the unsmoothed function. There are many methods for smoothing a function that may be used in various embodiments of the invention disclosed herein.

For example, the sigmoid activation function may be generalized to a parametric sigmoid function based on a hyperparameter T, called temperature. The parametric sigmoid function may be defined by the equation: A=f(x; T)=1/(1+exp(−x/T)). The standard sigmoid function is equivalent to a parametric sigmoid function with a temperature T=1. A sigmoid activation function may be smoothed by replacing it with a parametric sigmoid with a temperature T>1.

As another example, the max( ) activation function $\max_i\{x_i\}$ may be smoothed by replacing it by the function $$A = f(x_1, x_2, \ldots, x_k) = \max_i\{x_i\} \Big/ \left(1 + \sum_{i=1}^{k} \exp\left(-\frac{x_i}{T}\right)\right).$$

The regular max( ) function is the limiting value of this parametric function as the value of the hyperparameter T goes to 0. The max( ) activation function may be smoothed by replacing it with this parametric function with a value of T>0.

More generally, any activation function may be smoothed by filtering it with a low-pass filter. For example, an activation function can be smoothed by convolving it with any non-negative function, preferably a function f(x) that is symmetric around the value x=0 with a hyperparameter that controls the effective width of the smoothing. For example, any activation function may be smoothed by convolving it with the function $g(x)=\exp(-x^2/T)$.

In any of these examples, the value of the hyperparameter T may be changed during multiple passes though the loop from step 106 back to step 102. The changes may be determined by a fixed schedule or be controlled by a learning coach.

Steps 103 and 104 are both designed to improve the detectability of vulnerabilities to disturbances. The detection measurements used in steps 105 and 106 (described further below) are based on the partial derivatives of the objective with respect to the node activation of one or more nodes. However, the derivative of the rectified linear function ReLU(x) is zero for x<0. The derivative is zero for the hard sigmoid for x>1 as well as for x<0. For the Perceptron function, it is zero everywhere, except at x=0, where it is undefined. For the sigmoid function the derivative is small for values of x with large magnitudes and rapidly approaches zero as an asymptote. In general, the derivative of an unsmoothed activation function only back propagates information about the sensitivity to infinitesimally small disturbances. During back propagation, a node with a derivative of zero will always pass backward a zero value for the partial derivative of the objective to its connecting weights and to the connected nodes in lower layers, regardless of the magnitude of the partial derivative of the objective with respect to output value of the activation function. Regions with derivatives with very small magnitudes, such as the tails of the sigmoid function cause similar problems. Accordingly, step 103 prevents the derivative of an activation function from asymptotically approaching zero and step 104 creates a region with a derivative of significant magnitude around any discontinuous step in an activation function or any interval with a derivative of substantial magnitude. These are regions of high vulnerability to disturbances that would not be detected by the partial derivatives passed backwards by the unsmoothed activation functions.

On the network obtained in step 101 with the activation functions of the second set of nodes selected in step 102 modified in step 103 and/or step 104, at step 105 the computer system performs on the network with modified (e.g., linearly scaled or smoothed) activation functions, first, a feed forward computation of the activations of all the nodes in the network and, then, a back propagation of the partial derivatives of the objective function with respect to the activation values of all the nodes and with respect to all the connection weights, for each item of training data. These computations are well known to those skilled in the art of training neural networks by stochastic gradient descent. At step 105, the computer system extends the backpropagation computation to compute the partial derivatives of the objective with respect to each of the input values, which are not normally needed or computed for training by stochastic gradient descent.

Furthermore, in one embodiment, at step 105 the computer system does not compute updated values for the trained parameters nor make an update step or any change in the values of the trained parameters. Instead, step 105 uses the computed partial derivatives to assess the vulnerability of each of the first set of nodes selected in step 102 to disturbances, such as noise or deliberate adversarial actions. In one embodiment, for each node in the first set of nodes selected by step 102, step 105 forms a vector of the partial derivative of the objective with respect to the activation value of the selected node, with an element of the vector for each item of training data. Step 105 then computes a norm of this vector using any one of various vector norms in various embodiments. For example, step 105 may compute the L1 norm by taking the sums of the absolute values of the elements of the vector of partial derivatives. As another example, step 105 may compute the L2 norm by taking the square root of the sum of the squares of the element values. As yet another example, step 105 may compute the Max norm by computing the maximum absolute value of any of the elements.

Based on the vector norm computed for each selected node in the first set at step 105, at step 106 the computer detects relatively vulnerable nodes in the first set and selects a subset of the first set of nodes for further analysis or corrective action. For example, in some embodiments, step 106 may select all nodes in the first set with norms above a threshold value specified by a hyperparameter (which may be determined by the learning coach). In other embodiments, step 106 may select a specified number of nodes in the first set or a specified fraction of the nodes, such as a threshold number or threshold fraction of the nodes having the largest norms.

The further analysis to be performed on the selected nodes may be a separate analysis, for example some other type of analysis controlled by a learning coach. In some embodiments, the further analysis may be additional analysis done by returning the process 100 to step 102 as shown in FIG. 1 and setting different conditions, such as at steps 103 and 104 on the next iteration of the loop. For example different values may be set for one or more hyperparameters, especially a hyperparameter that affects the amount of smoothing, such as the hyperparameter T, discussed above in connection with step 104. In some embodiments, after one or more passes through the loop from step 106 back to step 102, the selection of a first set of selected nodes on which to test vulnerability may focus on the most vulnerable nodes selected by step 106. On the other hand, some embodiments may add additional nodes to the first set of nodes selected by step 102 based on the estimated likelihood that an additional node may influence the vulnerability of one of the vulnerable nodes detected in step 106.

Various corrective actions may be used by various embodiments of the invention described herein. For example, anti-adversarial action may be taken as described in PCT Application Publication No. WO2018/231708, entitled "ROBUST ANTI-ADVERSARIAL MACHINE LEARNING," which is incorporated herein by reference in its entirety. For example, in the unsmoothed function, the activation function may be replaced by a parametric activation function with a hyperparameter such as the hyperparameter T described above, which then may be reduced in value. Increasing the value of such a hyperparameter in step 104 makes vulnerability easier to detect. In some embodiments on the other hand, decreasing such a hyperparameter decreases the vulnerability to certain kinds of disturbances.

As another example, modifications may be made to the architecture of the network by a learning coach, for example, by adding one or more nodes, as described in PCT Application Publication No. WO2018/226492, entitled "ASYNCHRONOUS AGENTS WITH LEARNING COACHES AND STRUCTURALLY MODIFYING DEEP NEURAL NETWORKS WITHOUT PERFORMANCE DEGRADATION"; and PCT Application No. PCT/US2019/015389, filed Jan. 28, 2019, entitled "SELF-ORGANIZING PARTIALLY ORDERED NETWORKS," which are both incorporated herein by reference in their entirety.

In the illustrative embodiment shown in FIG. 1, another example of a corrective action is to perform a data split and create two new networks to form an ensemble or to add one or two additional members to an existing ensemble, as indicated by step 107. In this illustrative embodiment, the trained network obtained in step 101 could have been trained to convergence at least to the vicinity of a stationary point in the objective function. This convergence implies that the average value of the partial derivative of the objective function for the unsmoothed network with respect to any of the nodes is zero when averaged across all the items of training data.

On the other hand, step 106 selects vulnerable nodes based on their relatively large values for the norm of the vector of partial derivatives of the objective function with respect to the activation of a selected node. In an illustrative embodiment, step 106 selects one of the vulnerable nodes, which may be an input node. Step 106 then splits the training data into two subsets based on the sign of the derivative of the partial derivative of the objective with respect to the selected node. One embodiment uses the derivatives of the network computed for the smoothed activation functions. An alternate embodiment makes the data split based on the partial derivatives computed for the network with unsmoothed activation functions. Because the norm of the vector of partial derivatives is large, at least for the smoothed activation functions, there will be some data items with large absolute values, typically some with negative values and some with positive values because the average of the partial derivatives is close to zero, at least for the unsmoothed activation functions.

In various embodiments, at step 107 the computer system may evaluate more than one of the vulnerable nodes and choose the best one based on some criterion. One illustrative criterion is to choose the node that makes the most even split in the data, that is, the split in which the two subsets are closest to being equal in size. In other embodiments, a more complex criterion is computed, perhaps by a separate machine learning system, e.g., a learning coach. Some embodiments may create new ensemble members for a plurality of vulnerable nodes simultaneously.

Once a data split has been created, two new networks are created. Preferably, each new network is initialized with architecture and connection weights and biases identical to the original network obtained in step 101. The two new networks are trained as two members of an ensemble, each trained on only one of the two subsets created in the data split. In one embodiment, the original network obtained in step 101 is also retained as an ensemble member. In another embodiment, the original network is not retained.

In some embodiments, some amount of training of the new networks is performed using the smoothed activations functions and then the activations functions are switched, perhaps gradually, back to the original unsmoothed activation functions. In other embodiments, the new networks are trained using the unsmoothed activation functions from the start.

Other implementations of using a data split to create new ensemble members are described in PCT Application Publication No. WO2018/226527, entitled "DATA SPLITTING BY GRADIENT DIRECTION FOR NEURAL NETWORKS," which is incorporated herein by reference in its entirety.

As a general property an ensemble of machine learning systems performs better than any one of its individual members. The performance of an ensemble tends to improve as more members are added to the ensemble. However, the amount of incremental improvement generally declines as the ensemble becomes large. The best incremental improvement tends to be achieved when ensemble members are trained to have significant differences from each other. Embodiments that perform a data split in step 107 are designed to take advantage of this tendency. The data split creates a significant difference between the two new ensemble members. Selecting the data split based on one of the most vulnerable nodes will not only tend to improve the performance of the ensemble but will also reduce its vulnerability to disturbances.

The invention described herein identifies nodes that are vulnerable to disturbances, whether the disturbances are caused by noise, intentional adverse action, or some other cause. This information can be used in combination with any kind of remedial action. Data splitting as a remedial action is merely one illustrative example, which is not intended to limit the scope of the invention.

Based on the above description, it is clear that embodiments of the present invention can be used to improve many different types of machine learning systems, particularly neural networks and ensembles of neural networks, in a variety of applications. For example, embodiments of the present invention can improve recommender systems, speech recognition systems, and classification systems, including image and diagnostic classification systems, to name but a few examples, such as by correcting the vulnerability of individual nodes in the neural networks to changes in the input data.

Figure 3:
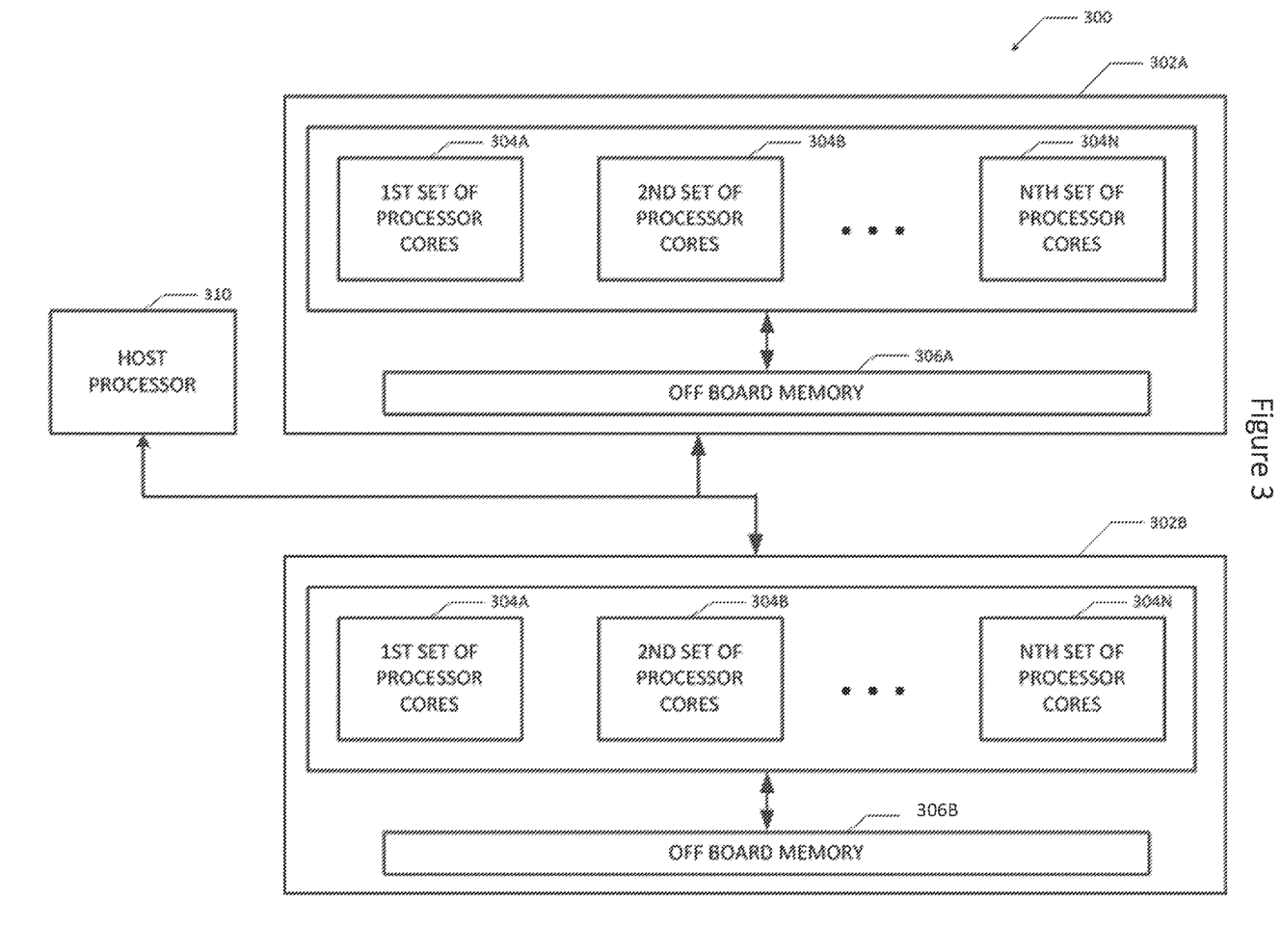
FIG. 3 is a diagram of a computer system according to various embodiments of the present invention.

FIG. 3 is a diagram of a computer system 300 that could be used to implement the embodiments described above, such as the process described in FIG. 1. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A-B. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement the neural network and the second processor unit 302B may implement the learning coach. For example, the cores of the first processor unit 302A may train the neural network and perform the process described in connection with FIG. 1, whereas the cores of the second processor unit 302B may learn, from implementation of the learning coach, the parameters for the neural network. Further, different sets of cores in the first processor unit 302A may be responsible for different subnetworks in the neural network or different ensemble members where the neural network comprises an ensemble. One or more host processors 310 may coordinate and control the processor units 302A-B.

In other embodiments, the system 300 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

Unless specifically stated otherwise as apparent from the foregoing disclosure, it is appreciated that, throughout the foregoing disclosure, discussions using terms such as "computing," "calculating," "determining," "selecting," or the like, refer to the action and processes of a computer system e.g., the computer system 300 of FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

Various aspects of the subject matter described herein are set out in the following aspects, implementations, and/or examples, which can be interchangeably combined together in various combinations:

In one general aspect, a method for analyzing vulnerability of a machine learning system comprises: (a) selecting, by a computer system, a first set of nodes of the machine learning system, wherein the first set of nodes comprises N nodes where N≥1; (b) selecting, by the computer system, a second set of nodes of the machine learning system, wherein the second set of nodes comprises n nodes where n≥1; (c) modifying, by the computer system, an activation function of one or more nodes of the second set of nodes to make the machine learning system more vulnerable to a disturbance in input data; (d) generating, by the computer system, for each node of the first set of nodes, a vector comprising a partial derivative of an objective with respect to an activation value for each data item from the input data; (e) calculating, by the computer system, a norm of each vector for each node of the first set of nodes; and (f) determining, by the computer system, which of the first set of nodes are vulnerable nodes according to the norms of the vectors.

In one aspect, modifying the activation function of one or more nodes of the second set of nodes comprises: adding, by the computer system, a linear slope to the activation function of one or more nodes of the second set of nodes.

In one aspect, modifying the activation function of one or more nodes of the second set of nodes comprises: smoothing, by the computer system, the activation function of one or more nodes of the second set of nodes.

In one aspect, smoothing the activation function of one or more nodes of the second set of nodes comprises: generalizing, by the computer system, the activation function of one or more nodes of the second set of nodes.

In one aspect, smoothing the activation function of one or more nodes of the second set of nodes comprises: applying, by the computer system, a low-pass filter to the activation function of one or more nodes of the second set of nodes.

In one aspect, the norm comprises an L1 norm of the vector.

In one aspect, the norm comprises an L2 norm of the vector.

In one aspect, the norm comprises a Max norm.

In one aspect, determining which of the first set of nodes are vulnerable nodes comprises: determining, by the computer system, whether the norm of the vector for each node of the first set of nodes exceeds a threshold.

In one aspect, determining which of the first set of nodes are vulnerable nodes comprises: selecting, by the computer system, a threshold number of nodes from the first set of nodes according to the norms of their vectors.

In one aspect, determining which of the first set of nodes are vulnerable nodes comprises: selecting, by the computer system, a threshold ratio of nodes from the first set of nodes according to the norms of their vectors.

In one aspect, the method further comprises: changing, by the computer system, a hyperparameter associated with at least one of steps (a)-(f) from a first value to a second value; and repeating, by the computer system, steps (a)-(f) with the hyperparameter at the second value.

In one aspect, the hyperparameter comprises a temperature of the activation function of one or more nodes of the second set of nodes.

In one aspect, the method further comprises: removing, by the computer system, the nodes of the first set of nodes that were determined not to be vulnerable; and repeating, by the computer system, steps (a)-(f).

In one aspect, the method further comprises: adding, by the computer system, one or more additional nodes of the machine learning system to the first set of nodes; and repeating, by the computer system, steps (a)-(f).

In one aspect, the method further comprises: replacing, by the computer system, the activation function for each of the vulnerable nodes with a parametric activation function; and reducing, by the computer system, a parameter of the parametric activation function.

In one aspect, the method further comprises: modifying, by a learning coach implemented by the computer system, an architecture of the machine learning system.

In one aspect, changing the architecture of the machine learning system comprises: adding, by the learning coach implemented by the computer system, one or more additional nodes to the machine learning system.

In one aspect, the method further comprises: splitting, by the computer system, the input data into a first dataset and a second dataset based on a sign of a derivative of the partial derivative of the objective with respect to a selected vulnerable node from the vulnerable nodes; creating, by the computer system, a first machine learning system and a second machine learning system from the machine learning system; training, by the computer system, the first machine learning system on the first dataset; and training, by the computer system, the second machine learning system on the second dataset.

In one aspect, the method further comprises: selecting, by the computer system, the selected vulnerable node from the vulnerable nodes according to which of the vulnerable nodes causes the first dataset and the second dataset to be most even in size.

In one aspect, the first machine learning system and the second machine learning system are each initialized with architecture, connection weights, and biases identical to the machine learning system.

In one aspect, the first machine learning system and the second machine learning system are trained as an ensemble.

In one aspect, the machine learning system comprises one or more input nodes and one or more output nodes; and the first set of nodes comprises the one or more input nodes.

In one aspect, the machine learning system comprises a neural network.

In one aspect, a computer system comprises a processor and a memory coupled to the processor, the memory storing a machine learning system and instructions that, when executed by the processor, cause the computer system to execute the method(s) enumerated above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A method for analyzing vulnerability of a machine learning system, the method comprising:
    (a) selecting, by a computer system, a first set of nodes of the machine learning system, wherein the first set of nodes comprises N nodes where N≥1;
    (b) selecting, by the computer system, a second set of nodes of the machine learning system, wherein the second set of nodes comprises n nodes where n≥1, and wherein the second set of nodes is not the same as the first set of nodes;
    (c) modifying, by the computer system, an activation function of one or more nodes of the second set of nodes to make the machine learning system more vulnerable to a disturbance in input data, wherein modifying the activation function changes a partial derivative of an objective with respect to an activation value for at least one node of the first set of nodes and at least one data item from the input data;
    (d) generating, by the computer system, for each node of the first set of nodes, a vector comprising the partial derivative of the objective with respect to the activation value for each data item from the input data;
    (e) calculating, by the computer system, a norm of each vector for each node of the first set of nodes; and
    (f) determining, by the computer system, which of the first set of nodes are vulnerable nodes according to the norms of the vectors.

2. The method of claim 1, wherein modifying the activation function of one or more nodes of the second set of nodes comprises:
    adding, by the computer system, a linear slope to the activation function of one or more nodes of the second set of nodes.

3. The method of claim 1, wherein modifying the activation function of one or more nodes of the second set of nodes comprises:
    smoothing, by the computer system, the activation function of one or more nodes of the second set of nodes.

4. The method of claim 3, wherein smoothing the activation function of one or more nodes of the second set of nodes comprises:
    generalizing, by the computer system, the activation function of one or more nodes of the second set of nodes.

5. The method of claim 3, wherein smoothing the activation function of one or more nodes of the second set of nodes comprises:
    applying, by the computer system, a low-pass filter to the activation function of one or more nodes of the second set of nodes.

6. The method of claim 1, wherein the norm comprises an L1 norm of the vector.

7. The method of claim 1, wherein the norm comprises an L2 norm of the vector.

8. The method of claim 1, wherein the norm comprises a Max norm.

9. The method of claim 1, wherein determining which of the first set of nodes are vulnerable nodes comprises:
    determining, by the computer system, whether the norm of the vector for each node of the first set of nodes exceeds a threshold.

10. The method of claim 1, wherein determining which of the first set of nodes are vulnerable nodes comprises:
    selecting, by the computer system, a threshold number of nodes from the first set of nodes according to the norms of their vectors.

11. The method of claim 1, wherein determining which of the first set of nodes are vulnerable nodes comprises:
    selecting, by the computer system, a threshold ratio of nodes from the first set of nodes according to the norms of their vectors.

12. The method of claim 1, further comprising:
    changing, by the computer system, a hyperparameter associated with at least one of steps (a)-(f) from a first value to a second value; and
    repeating, by the computer system, steps (a)-(f) with the hyperparameter at the second value.

13. The method of claim 12, wherein the hyperparameter comprises a temperature of the activation function of one or more nodes of the second set of nodes.

14. The method of claim 1, further comprising:
    removing, by the computer system, the nodes of the first set of nodes that were determined not to be vulnerable; and
    repeating, by the computer system, steps (a)-(f).

15. The method of claim 1, further comprising:
adding, by the computer system, one or more additional nodes of the machine learning system to the first set of nodes; and
repeating, by the computer system, steps (a)-(f).

16. The method of claim 1, further comprising:
replacing, by the computer system, the activation function for each of the vulnerable nodes with a parametric activation function; and
reducing, by the computer system, a parameter of the parametric activation function.

17. The method of claim 1, further comprising:
modifying, by a learning coach implemented by the computer system, an architecture of the machine learning system.

18. The method of claim 17, wherein changing the architecture of the machine learning system comprises:
adding, by the learning coach implemented by the computer system, one or more additional nodes to the machine learning system.

19. The method of claim 1, further comprising:
splitting, by the computer system, the input data into a first dataset and a second dataset based on a sign of a derivative of the partial derivative of the objective with respect to a selected vulnerable node from the vulnerable nodes;
creating, by the computer system, a first machine learning system and a second machine learning system from the machine learning system;
training, by the computer system, the first machine learning system on the first dataset; and
training, by the computer system, the second machine learning system on the second dataset.

20. The method of claim 19, further comprising:
selecting, by the computer system, the selected vulnerable node from the vulnerable nodes according to which of the vulnerable nodes causes the first dataset and the second dataset to be most even in size.

21. The method of claim 19, wherein the first machine learning system and the second machine learning system are each initialized with architecture, connection weights, and biases identical to the machine learning system.

22. The method of claim 19, wherein the first machine learning system and the second machine learning system are trained as an ensemble.

23. The method of claim 1, wherein:
the machine learning system comprises one or more input nodes and one or more output nodes; and
the first set of nodes comprises the one or more input nodes.

24. The method of claim 1, wherein the machine learning system comprises a neural network.

25. A computer system comprising:
a processor; and
a memory coupled to the processor, the memory storing a machine learning system and instructions that, when executed by the processor, cause the computer system to:
(a) select a first set of nodes of the machine learning system, wherein the first set of nodes comprises N nodes where N≥1;
(b) select a second set of nodes of the machine learning system, wherein the second set of nodes comprises n nodes where n≥1, and wherein the second set of nodes is not the same as the first set of nodes;
(c) modify an activation function of one or more nodes of the second set of nodes to make the machine learning system more vulnerable to a disturbance in input data, wherein modifying the activation function changes a partial derivative of an objective with respect to an activation value for at least one node of the first set of nodes and at least one data item from the input data;
(d) generate, for each node of the first set of nodes, a vector comprising the partial derivative of the objective with respect to the activation value for each data item from the input data;
(e) calculate a norm of each vector for each node of the first set of nodes; and
(f) determine which of the first set of nodes are vulnerable nodes according to the norms of the vectors.

26. The computer system of claim 25, wherein the instructions cause the computer system to modify the activation function of one or more nodes of the second set of nodes by:
adding a linear slope to the activation function of one or more nodes of the second set of nodes.

27. The computer system of claim 25, wherein the instructions cause the computer system to modify the activation function of one or more nodes of the second set of nodes by:
smoothing the activation function of one or more nodes of the second set of nodes.

28. The computer system of claim 27, wherein the instructions cause the computer system to smooth the activation function of one or more nodes of the second set of nodes by:
generalizing the activation function of one or more nodes of the second set of nodes.

29. The computer system of claim 27, wherein the instructions cause the computer system to smooth the activation function of one or more nodes of the second set of nodes by:
applying a low-pass filter to the activation function of one or more nodes of the second set of nodes.

30. The computer system of claim 25, wherein the norm comprises an L1 norm of the vector.

31. The computer system of claim 25, wherein the norm comprises an L2 norm of the vector.

32. The computer system of claim 25, wherein the norm comprises a Max norm.

33. The computer system of claim 25, wherein the instructions cause the computer system to determine which of the first set of nodes are vulnerable nodes by:
determining whether the norm of the vector for each node of the first set of nodes exceeds a threshold.

34. The computer system of claim 25, wherein the instructions cause the computer system to determine which of the first set of nodes are vulnerable nodes by:
selecting a threshold number of nodes from the first set of nodes according to the norms of their vectors.

35. The computer system of claim 25, wherein the instructions cause the computer system to determine which of the first set of nodes are vulnerable nodes by:
selecting a threshold ratio of nodes from the first set of nodes according to the norms of their vectors.

36. The computer system of claim 25, wherein the instructions further cause the computer system to:
change a hyperparameter associated with at least one of steps (a)-(f) from a first value to a second value; and
repeat steps (a)-(f) with the hyperparameter at the second value.

37. The computer system of claim 36, wherein the hyperparameter comprises a temperature of the activation function of one or more nodes of the second set of nodes.

38. The computer system of claim 25, wherein the instructions further cause the computer system to:

remove the nodes of the first set of nodes that were determined not to be vulnerable; and
repeat steps (a)-(f).

39. The computer system of claim 25, wherein the instructions further cause the computer system to:
add one or more additional nodes of the machine learning system to the first set of nodes; and
repeat steps (a)-(f).

40. The computer system of claim 25, wherein the instructions further cause the computer system to:
replace the activation function for each of the vulnerable nodes with a parametric activation function; and
reduce a parameter of the parametric activation function.

41. The computer system of claim 25, wherein:
the memory further stores a learning coach programmed to control the machine learning system; and
the instructions further cause the computer system to:
modify, by the learning coach, an architecture of the machine learning system.

42. The computer system of claim 41, wherein the instructions cause the computer system to change the architecture of the machine learning system by:
adding, by the learning coach, one or more additional nodes to the machine learning system.

43. The computer system of claim 25, wherein the instructions further cause the computer system to:
split the input data into a first dataset and a second dataset based on a sign of a derivative of the partial derivative of the objective with respect to a selected vulnerable node from the vulnerable nodes;
create a first machine learning system and a second machine learning system from the machine learning system;
train the first machine learning system on the first dataset; and
train the second machine learning system on the second dataset.

44. The computer system of claim 43, wherein the instructions further cause the computer system to:
select the selected vulnerable node from the vulnerable nodes according to which of the vulnerable nodes causes the first dataset and the second dataset to be most even in size.

45. The computer system of claim 43, wherein the first machine learning system and the second machine learning system are each initialized with architecture, connection weights, and biases identical to the machine learning system.

46. The computer system of claim 43, wherein the first machine learning system and the second machine learning system are trained as an ensemble.

47. The computer system of claim 25, wherein:
the machine learning system comprises one or more input nodes and one or more output nodes; and
the first set of nodes comprises the one or more input nodes.

48. The computer system of claim 25, wherein the machine learning system comprises a neural network.

\* \* \* \* \*